United States Patent [19]

Mahmoudian et al.

[11] Patent Number: 5,668,477
[45] Date of Patent: Sep. 16, 1997

[54] NOISE DETECTING APPARATUS FOR MAGNETIC HEADS

[75] Inventors: Mostafa Mahmoudian, San Carlos; Jagdeep S. Buttar, Union City; Oleg A. Gergel, Mountain View; Neil Motiska, Danville, all of Calif.

[73] Assignee: Read-Rite Corporation, Milpitas, Calif.

[21] Appl. No.: 389,301

[22] Filed: Feb. 16, 1995

[51] Int. Cl.6 .............................. G01B 27/36; G01R 33/12
[52] U.S. Cl. ...................... 324/613; 324/210; 324/212; 360/31
[58] Field of Search ...................... 324/613, 210, 324/212; 360/31; 369/53, 54

[56] References Cited

U.S. PATENT DOCUMENTS

| | | | |
|---|---|---|---|
| 2,528,682 | 11/1950 | Blaney | 324/212 |
| 3,375,439 | 3/1968 | Yamamoto | 324/210 |
| 3,681,682 | 8/1972 | Cox et al. | 324/216 |
| 4,423,380 | 12/1983 | Pilers | 324/216 |
| 4,940,938 | 7/1990 | Naito et al. | 324/212 |
| 5,134,366 | 7/1992 | Kirk | 324/613 |
| 5,479,698 | 1/1996 | Yokoyama et al. | 324/212 |

FOREIGN PATENT DOCUMENTS

1216797  3/1986  U.S.S.R. .................. 324/212

*Primary Examiner*—Kenneth A. Wieder
*Assistant Examiner*—Diep Do
*Attorney, Agent, or Firm*—Nathan N. Kallman

[57] ABSTRACT

A testing apparatus for detecting popcorn noise in magnetic heads comprises a fully integrated testing system which includes an analog circuit portion and a digital circuit portion. The analog circuit portion is implemented to interface with a magnetic head while the digital circuit portion is designed to store the testing sequence, analyze the testing data, control and execute the testing routines. The testing apparatus is designed for production environments where testing data are required instantaneously as feedback for production process monitoring.

21 Claims, 7 Drawing Sheets

NOISE DETECTING APPARATUS FOR MAGNETIC HEADS

FIELD OF THE INVENTION

This invention relates to detection of signal noise, and in particular to an apparatus for detecting Barkhausen noise in magnetic heads.

BACKGROUND OF THE INVENTION

Magnetic media in the form of tapes or disks have been widely used for storage of information. Magnetic heads are commonly employed for the tasks of interacting with these magnetic media for information storage and retrieval. As is well known in the art, a magnetic head comprises an inductive coil sandwiched between a pair of magnetic poles. During the data writing mode, the current carrying coil induces magnetic flux into the magnetic poles, which in turn magnetize a moving recording medium disposed close to the magnetic head. Similarly, during the data reading mode, magnetic flux emanating from a recording medium is intercepted by the magnetic poles, which in turn induces electrical current in the inductive coil. The induced current in the coil corresponds to the information stored in the recording medium.

Operations of the aforementioned types of magnetic head are subject to various problems. One significant problem is Barkhausen noise that is encountered during the reading and writing processes, which noise arises mainly from magnetic domain instability in the magnetic poles. Each magnetic pole in the magnetic head assumes a certain magnetic domain pattern at its quiescent state. During the data writing mode, write current flowing into the coil induces magnetic flux which traverses the pole. The Joule heat generated by the write current is sufficient to cause considerable thermal expansion in the magnetic pole and the surrounding dielectric material. Since the coefficients of thermal expansion are different between the magnetic pole material and the dielectric material, thermal stress is thereby created. In response, the original domain pattern is altered into a different pattern. Upon the withdrawal of the write current at the end of the writing process, the altered domain pattern again changes in an effort to recover itself to its original pattern. This time, the domain pattern changes relatively sluggishly and correspondingly induces electrical noise in the inductive coil. The noise so induced, is commonly called popcorn noise or Barkhausen noise. The occurrence of popcorn noise during normal operations is detrimental to the performance of the magnetic head.

It should be noted that the emerging of popcorn noise in magnetic heads is highly unpredictable. Some magnetic heads are more prone to generate popcorn noise than others. However, there appears to be a strong correlation between the propensity of popcorn noise in a magnetic head and the fabrication process. That is, there are lot-to-lot differences with regard to popcorn noise susceptibility in the magnetic heads resulting from manufacturing. A well-controlled manufacturing process could screen out magnetic heads with sub-standard performance. However, a testing tool capable of detecting popcorn noise in the magnetic heads with accuracy must first be provided.

Heretofore, no optimum systematic approach for detection of popcorn noise in magnetic heads has yet been devised. A typical test setup involves linking different signal generators and measuring equipments together. As arranged, popcorn noise events are normally observed and counted through the display of an oscilloscope. The main drawback of such an approach is the lack of accuracy. Very often, externally generated noise masks out the actual popcorn noise intended to be detected. Moreover, monitoring of such testing system is a cumbersome endeavor. For example, a change in a measuring parameter would require a readjustment of different equipments. Accordingly, these test setups are inaccurate and especially not suitable for the production environment.

SUMMARY OF THE INVENTION

An object of this invention is to provide a magnetic head tester characterized by a high degree of accuracy.

Another object of the invention is to provide a magnetic head tester capable of performing the testing process automatically, rapidly, and with minimal human intervention.

In accordance with this invention, a fully integrated testing system comprises an analog circuit portion and a digital circuit portion. The analog circuit portion is implemented to interface with a magnetic head while the digital circuit portion is designed to store the testing sequence, analyze the testing data, control and execute the testing routines.

The analog circuit portion comprises an input circuit adapted to receive a magnetic head, a mode select circuit, a bandpass filter, an amplifier circuit, and comparator circuits installed as noise discriminators. The gain and the threshold levels of the amplifier and the comparator circuits, respectively, are digitally controlled by the digital circuit portion.

The digital circuit portion includes a Central Processing Unit (CPU), a timing control and counter circuit, a data pattern generation circuit and memory circuits. The various circuits in the digital circuit portion are connected and operated together through data and address buses.

A plurality of signal lines also electrically connects the analog circuit portion and the digital circuit portion. The outputs of the comparator circuits of the analog circuit portion are channeled into the timing control and counter circuit of the digital circuit portion for the cumulative tallying of noise events during testing.

In addition, there is a noise simulation circuit provided for the fine tuning of the testing process.

The testing apparatus of the present invention is characterized by three modes of operation, namely, the data writing mode, the data reading mode and the clamping mode.

To imitate the actual writing operation of a magnetic head during normal use, the data writing mode performs the duty of stressing the magnetic head prior to any noise detection. In essence, the timing control circuit generates a writing cycle which activates the mode select circuit and allows data pattern generated from the pattern generation circuit to be written into the magnetic head. Upon withdrawal of the write current, popcorn noise may be induced in the magnetic head, as explained above. The popcorn noise is detected during the reading mode which is initiated by the timing control circuit. During the reading mode, the timing control circuit generates a reading cycle which activates the mode select circuit and allows the induced noise to pass through the amplifier circuit. Should the amplitudes of the noise pulses exceed the predetermined threshold levels of the comparators, the noise pulses would be registered and cumulatively counted as noise events by the counter circuit tied to the outputs of the comparators.

The clamping mode operates between the writing mode and the reading mode. Operating in the clamping mode, the timing control circuit initiates a clamping cycle which activates the mode select circuit to bypass any noise not related to popcorn noise generated immediately after the writing cycle, thereby accurately reporting the popcorn noise counts in the magnetic head.

The testing apparatus of the present invention is specifically designed for production environments where testing data are required instantaneously as feedback for production process monitoring.

These and other advantages, features, and objects of the present invention will be apparent from the following description in conjunction with the drawings.

DETAILED DESCRIPTION OF THE INVENTION

General Description and Architecture

Figure 1:
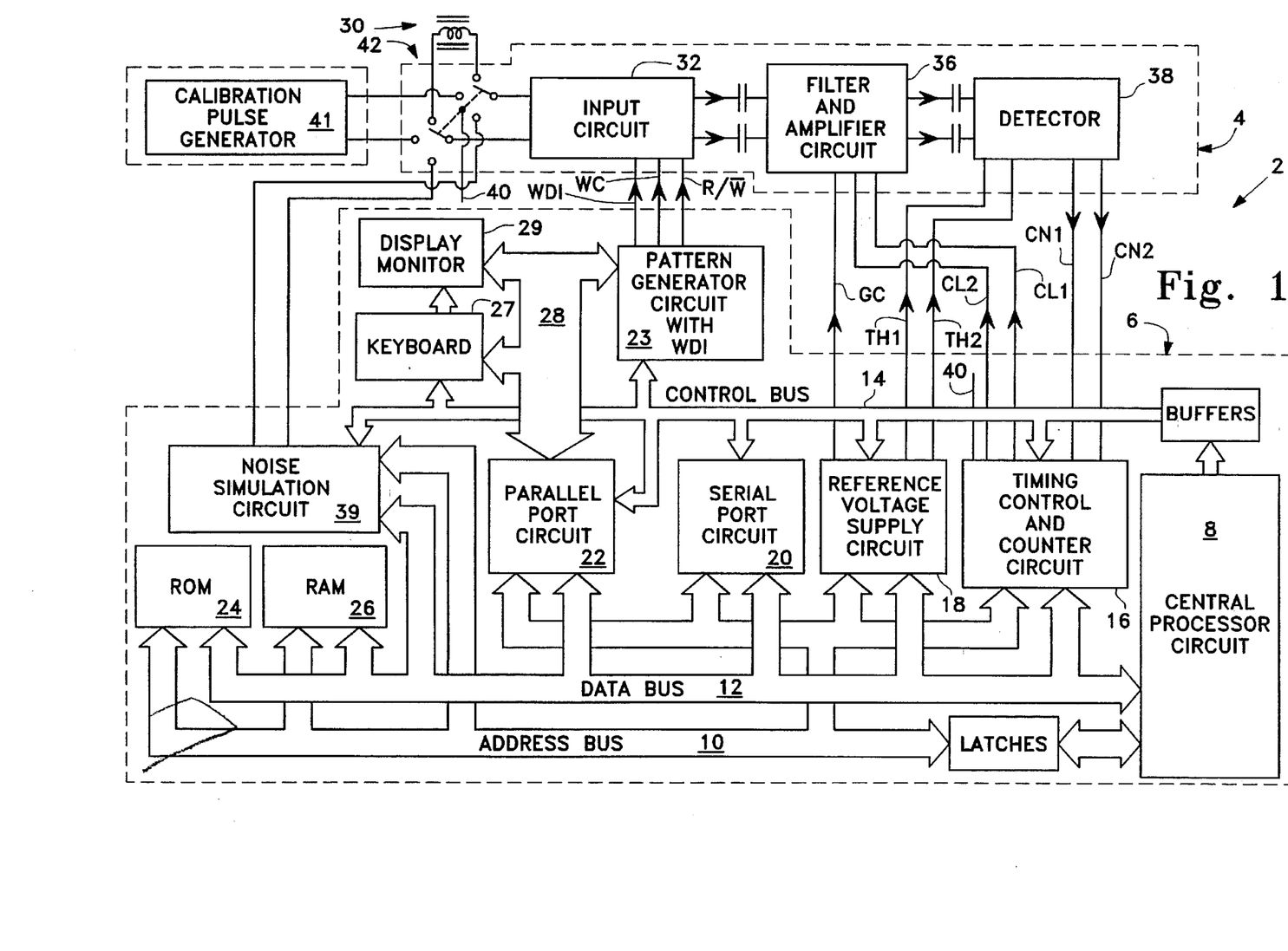
FIG. 1 is a schematic drawing showing the general architecture of the preferred embodiment of the invention.

Reference is now made to FIG. 1 which is a schematic block diagram of the testing apparatus of the invention, signified by reference numeral 2. The testing apparatus 2 may be partitioned into an analog circuit portion 4 and a digital circuit portion 6.

The digital circuit portion 6 is in essence a microcomputer having a CPU 8 driving an address bus 10, a data bus 12, and a control bus 14. The buses 10, 12 and 14 in turn interface with various peripheral circuits such as a timing control and counter circuit 16, a reference voltage supply circuit 18, a serial port circuit 20, a parallel port circuit 22 and a pattern generator circuit 23 with Write Data Interface (WDI). There are also a Read Only Memory (ROM) circuit 24 and a Random Access Memory (RAM) circuit 26 coupled to the buses 10 and 12 for the storage of testing routines and data. External control of the testing apparatus 2 is conducted through a keyboard 27 and a display monitor 29 linking the control bus 14 and the parallel data output bus 28.

The analog circuit portion 4 includes a filter and amplifier circuit 36 disposed between an input circuit 32 and a detector circuit 38. The input circuit 32 is basically a small circuit board specifically built to accommodate a particular magnetic head. In this embodiment, the magnetic head under test, denoted by reference numeral 30, is releasably mounted to the input circuit 32, which in turn is releasably attachable to the filter and amplifier circuit 36. The detector circuit 38 is connected to the output of the filter and amplifier circuit 36. The detector circuit 38 acts as a noise discriminator. Any noise spike exceeding a specified threshold level will be alerted by the detector circuit 38, and reported to the timing control and counter circuit 16 as a noise event.

A noise simulation circuit 39 and a calibration pulse generator 41 are included in the testing apparatus 2. The functions of the noise simulation circuit 39 and the calibration pulse generator 41 will be explained later.

Prior to any noise detection, the magnetic head 30 needs first be stressed. Upon the withdrawal of the stress current, noise induced in the magnetic head 30 is then detected and analyzed. The testing apparatus 2 of the present invention accomplishes these tasks by providing three modes of operation, namely, the data writing mode, the data reading mode and the clamping mode. During the writing mode, a predefined data pattern generated by the pattern generator circuit 23 with WDI is written into the magnetic head 30 via the input circuit 32. Upon completion of the data writing process, there is a period of relaxation that the magnetic head 30 experiences. At the onset of and prior to this relaxation period, various types of noise can be induced in the magnetic head 30. To screen out other irrelevant noise spikes, the clamping mode is deployed to fulfill this function. The installation of the clamping mode prevents non-popcorn related noise from entering to the detector circuit 38. The clamping mode also speeds up the writing mode to reading mode transition which will also be explained later. During the data reading mode, noise pulses occurring in the magnetic head 30 are filtered and amplified by the filter and amplifier circuit 36, and detected by the detector circuit 38. Should the noise level of a noise pulse exceed one of the predetermined threshold levels set by the threshold lines TH1 and TH2 tied to the timing control and counter circuit 16, the noise pulse would be reported as a noise event.

Figure 2:
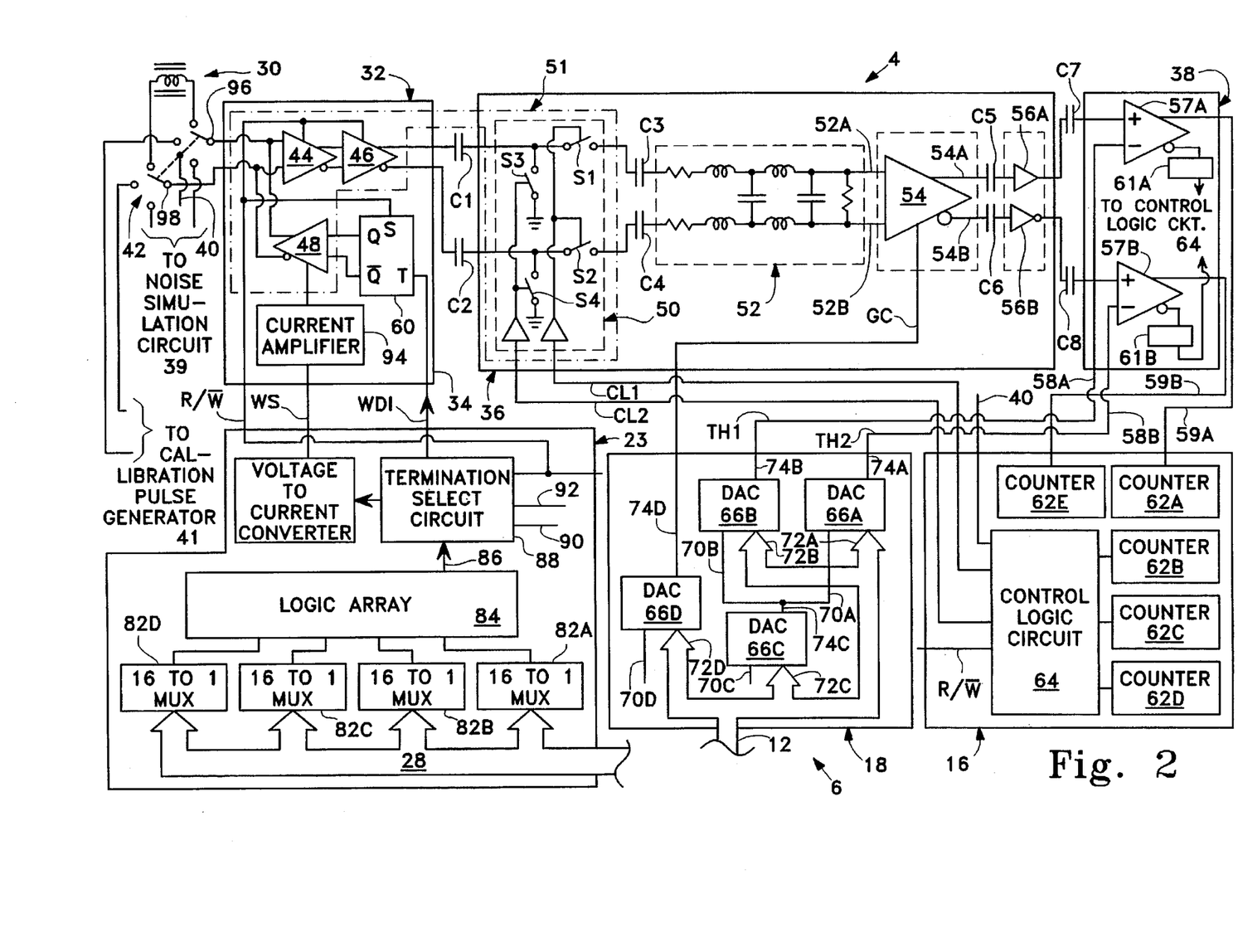
FIG. 2 is a schematic drawing highlighting the key circuitries in further detail.

FIG. 2 is a more detailed schematic of the invention showing key circuitries. Adjacent to the input circuit 32 is a three-way switch 42 which can be directed to link the input circuit 32 separately to the magnetic head 30, the calibration pulse generator 41, or the noise simulation circuit 39. The three-way switch 42 is controlled by a switch control line 40 originating from the timing control and counter circuit 16. Input circuit 32 in this exemplary embodiment is a separate circuit card designed specifically to accommodate a particular magnetic head. There is also a mechanical socket (not shown) built in the circuit card 32 for receiving the magnetic head 30.

On the circuit card 32 are drivers 44, 46 and 48 disposed between the three-way switch 42 and the filter and amplifier circuit 36. Drivers 44, 46 and 48 are parts of a mode select circuit 51 which is installed for the proper communication of signal traffic. For example, during the data writing mode, drivers 44 and 46 are disabled while the driver 48 is enabled. Data from the parallel data output bus 28 piping into the pattern generator circuit 23 is first multiplexed and then written into the magnetic head 30 via the WDI signal line, a toggle flip flop 60 and the activated driver 48. During the data reading mode, drivers 44 and 46 are enabled while the driver 48 is disabled. Electrical signals from the input nodes 96 and 98 are allowed to gate through the input circuit 32 into the filter and amplifier circuit 36. The filter and amplifier circuit 36 essentially comprises a clamping circuit 50, a band-pass filter 52, an amplifier 54 and buffers 56A and 56B. The clamping circuit 50 is another part of the mode select circuit 51. The functions of each of these sub-circuits 50, 52, 56A and 56B will be explained further later. The outputs of the buffers 56A and 56B are directly connected to a pair of comparators 57A and 57B, respectively, located inside the detector circuit 38. There are two threshold control lines TH1 and TH2 connecting the comparators 57A and 57B, respectively, to the reference voltage supply circuit 18. The threshold control lines TH1 and TH2 are two analog signal lines with voltage values adjustable by the reference voltage supply circuit 18. The voltage values at the threshold control lines TH1 and TH2 establish acceptance levels for the detected noise pulses as noise events.

Exiting out of the analog circuit portion 4, the outputs of the detector circuit 38 are tied to the inputs of the timing control and counter circuit 16 in the digital circuit portion 6. The timing control and counter circuit 16 comprises a plurality of counters 62A–62E and a control logic circuit 64. Noise pulses qualified by the detector circuit 38 as noise events are cumulatively counted by the counters 62A and 62E, and stored in the RAM circuit 26 (FIG. 1) via data bus 10 for later analysis or reporting.

The reference voltage supply circuit 18 includes a bank of digital-to-analog Circuits (DACs) 66A–66D which digitally control the gain of the amplifier 54, and the threshold levels TH1 and TH2 of detector circuit 38 as mentioned previously. The detailed description of the functions of these DACs 66A–66D will be elaborated later.

The testing apparatus 2 arranged, as above described, establishes certain important features of the invention. To begin with, testing of magnetic heads can be carried out systematically, automatically and continuously. Testing programs with the desired testing sequences can first be preloaded in the RAM circuit 26. Changes in testing parameter can easily be executed through the keyboard 27 and monitor 29. Testing results are stored in the RAM circuit 26 via the timing control and counter circuit 16, which testing results can be analyzed or statistically processed by the CPU 8. The testing apparatus 2 would be especially suitable for use in a production environment in which analyzed data can be fed back instantaneously to the fabrication line for production process monitoring.

In the following paragraphs, functional operation of the various circuits shown in FIG. 2 will be described in further detail in conjunction with the different modes of operation of the testing apparatus 2. In particular, specific examples with parameters are illustrated for ease of understanding. However, it should be understood that the detailed descriptions are exemplary only and are by no means limiting.

Calibration before Testing

Another important aspect of the invention is that the testing apparatus 2 is capable of being calibrated before testing, thereby providing accurate testing results irrespective of changes in testing environments.

Figure 3:
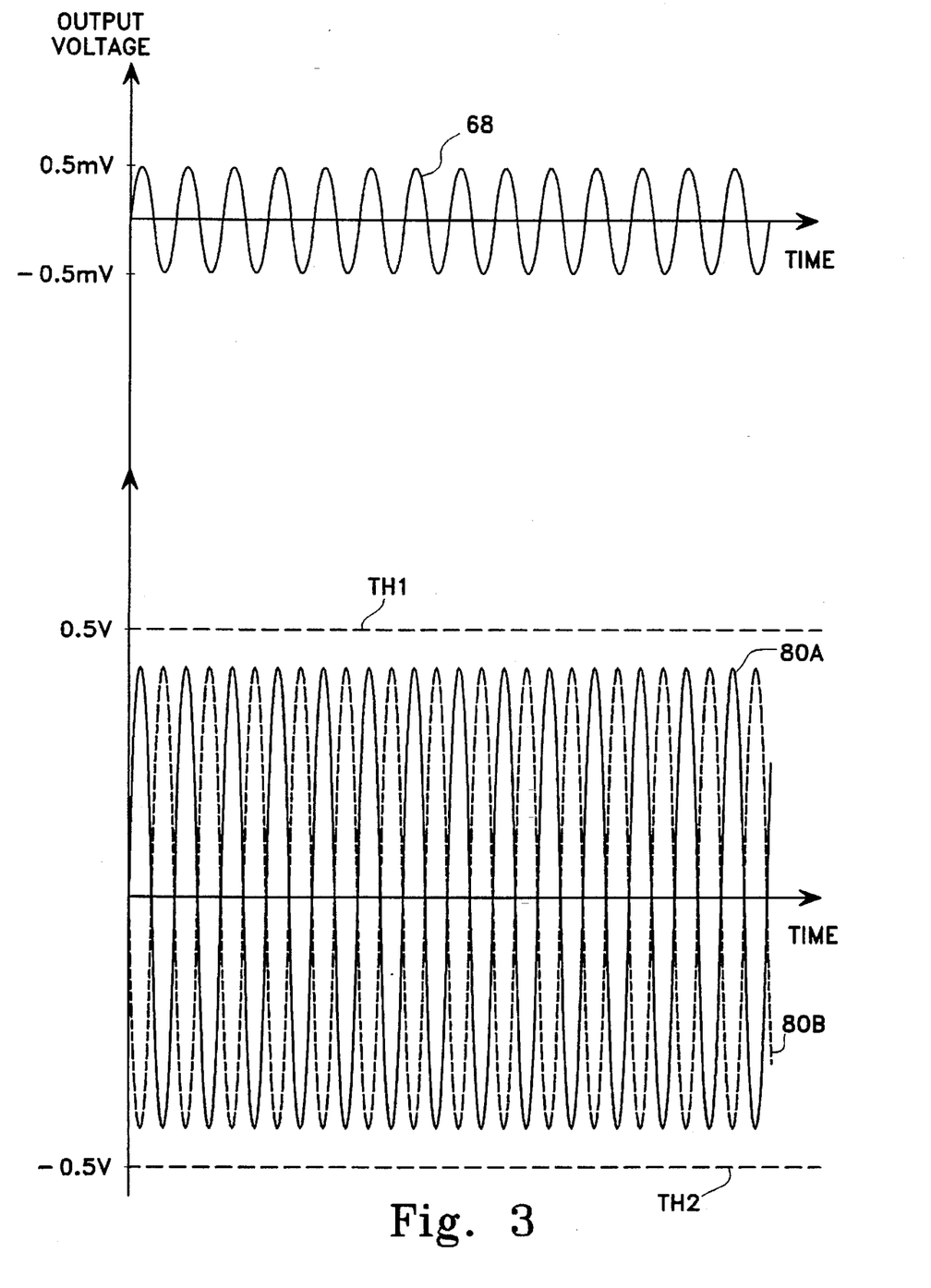
FIG. 3 is a timing diagram showing the calibration pulses provided and generated by the testing apparatus of the invention during the calibration process.

At the beginning of each production run, the testing apparatus 2 is normally calibrated prior to the actual testing. First, either automatically through the preloaded testing program in the RAM circuit 26 or by manual intervention via the keyboard 27, the CPU 8 is directed to hook up the input switch 42 to the calibration pulse generator 41 (FIG. 2). In this example, the calibration pulse generator 41 provides a 100 millivolt (mV) peak-to-peak sinusoidal wave, and is attenuated by a 100:1 ratio as a 1 mV peak-to-peak wave impinging upon input nodes 96 and 98. The 1 mV peak-to-peak wave is shown as waveform 68 in FIG. 3. Concurrently, the read/write select line R/W, which originates from the pattern generator circuit 23, is set to HIGH which enables drivers 44 and 46, but disables the driver 48. The sinusoidal wave 68 is allowed to pass through the clamping circuit 50 which is also disabled by the signal lines CL1 and CL2 at this time. That is, switches S1 and S2 are electrically closed while at the same time, switches S3 and S4 are open. Moreover, the frequency of the sinusoidal wave 68 is set within the passband of the filter circuit 52. Consequently, the sinusoidal wave 68, with no amplitude attenuation, easily passes through the bandpass filter 52 and reaches the amplifier 54. The bandpass filter 52 plays a more significant role during the data reading mode. Capacitors C1 and C2 are installed primarily for the passage of AC signal by filtering away any DC components and have therefore no effect on the waveform 68.

Attention is now directed to the amplifier 54 which has a variable gain controllable by the gain control line GC. Initially, the gain of amplifier 54 is tuned to zero through gain control line GC, which in turn is set digitally by the DAC 66D. As is known in the art, a DAC can provide, as an output, a variable analog voltage level as a fraction of the corresponding input voltage level, dictated primarily by the digital input of the DAC. For example, in this case, the DAC 66D has an analog input 70D, a digital input 72D, and an analog output 74D. Suppose the analog reference voltage input 70D is set at a 5-Volt DC level. The digital input 72 is an 8-bit wide bus capable of generating 256 ($2^8$) levels. Thus the analog output 74D of the DAC 66D can provide voltage levels ranging from 0 Volt up to 5 Volts in 1/256-Volt increments, depending upon what data value appears at the digital input 72D.

With reference to the cascade arrangement of the DACs 66A, 66B and 66C, the analog output 74C of the DAC 66C is tied to the analog inputs 70A and 70B of DACs 66A and 66B, respectively. In this example, at the start of the calibration process, a 5-Volt DC voltage is first applied to the analog inputs 70C and 70D of the respective DACs 66C and 66D. With appropriate digital values supplied at the digital inputs 72A, 72B and 72C of the respective DACs 66A, 66B and 66C, a 1-Volt DC voltage level can be obtained at the threshold lines TH1 and TH2. It should be recalled that the amplifier 54 is initially set with a gain of zero by the DAC 66D. No output levels can therefore be detected at the outputs 54A and 54B of the amplifier 54. However, as the gain of the amplifier 54 is increased digitally by incrementing the digital input 72D of the DAC 66D, a point would be reached where the voltage output levels at amplifier outputs 54A and 54B, represented by the respective waveforms 80A and 80B shown in FIG. 3, barely exceed the 1-Volt reference voltage levels TH1 and TH2 preset at the inputs of the respective comparators 57A and 57B. At this juncture, fast flip-flops 61A and 61B, located inside the detector circuit 38, each would register a count and the digital value at the input 72D of the DAC 66D is immediately frozen, captured and stored into the RAM 26 by the CPU 8. With the input waveform 68 at an amplitude of 1 mV and the output of the amplifier at 1 Volt, the amplifier 54 is said to have attained a gain of 1000. Phrased differently, the gain of the amplifier 54, which is defined as the ratio of the voltage at amplifier outputs 54A and 54B to the corresponding voltage at input nodes 96 and 98, can be accurately calibrated as set forth above, independent of other factors such as fabrication tolerances of the circuit components. Thereafter, magnitudes of noise pulses impinging on the input nodes 96 and 98 of the input circuit 32 can be ascertained with certainty.

The testing apparatus 2 is now ready for testing.

Modes of Operation

The testing apparatus of the present invention is characterized by three modes of operation, namely, the data writing mode, the data reading mode and the clamping mode.

The data writing mode fulfills the duty of stressing the magnetic head under test prior to any noise detection. As discussed earlier, the data writing process initiates magnetic domain pattern changes in the magnetic pole. Upon the withdrawal of the writing current, the magnetic domain pattern in the magnetic pole changes relatively sluggishly in an attempt to recover to its original pattern. The changes in the magnetic domain pattern correspondingly induce noisy current in the inductive coil as popcorn noise.

Figure 4:
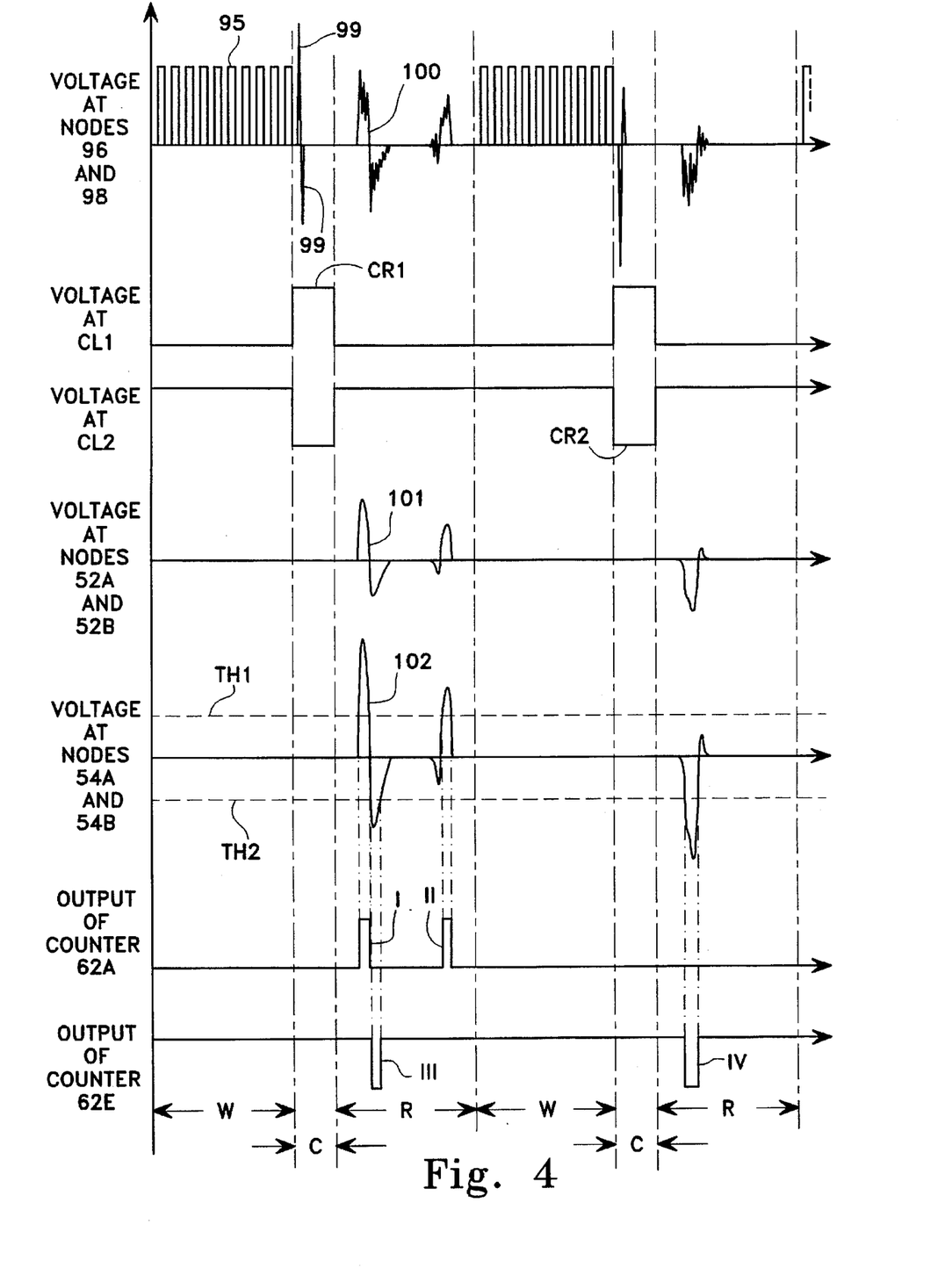
FIG. 4 is a timing diagram showing the relevant signal displays provided and generated by the testing apparatus of the invention during the three modes of operation, namely, the data writing mode, the clamping mode and the data reading mode.

Reference is now made to FIGS. 2 and 4. Before the writing process, the switch control line 40 is first switched to link the magnetic head 30 to the input circuit portion 34. At the same time, the mode select circuit 51 is activated in which the read/write signal line R/W̄ is set to LOW by the control logic circuit 64 located inside the timing control and counter circuit 16. As a result, drivers 44 and 46 are disabled while the driver 48 is enabled. Data from output data bus 28 are multiplexed by multiplexers 82A–82D and processed by the logic array 84. The output of the logic array circuit 84 is fed to the termination select circuit 88, which in combination with the various control signals 90 and 92 originated from the CPU 8, generates a control writing pattern at the output line WDL. The signal at the output line WDI in turn toggles the flip-flop 60, which in conjunction with the writing current supplied by the current amplifier 94, writes a data pattern into the magnetic head 30.

Shown in FIG. 4 is the signal waveform signified by reference numeral 95 at input nodes 96 and 98 of the input circuit 32 during the write period W. Waveform 95 assumes a Non Return to Zero (NRZ) data format.

Immediately after the data writing process, there is a period of time C during which the electrical signal is not quite settled. Specifically, the waveform may be riddled with spurious noise, such as noise spikes 99, possibly caused by the inductive responses of the coil due to the sudden cessation of writing current. The noise spikes generated during the period C are not at all related to popcorn noise and should therefore be excluded in the detection process. To achieve this end, the mode select circuit 50 is activated during the clamping mode prior to the data reading mode.

To activate the mode select circuit 51 during the clamping mode, the read/write signal line R/W̄ is first switched to HIGH. The driver 48 is thereby disabled while drivers 44 and 46 are enabled. The clamping control lines CL1 and CL2 are set to HIGH and LOW, respectively, for the duration of the clamping period C, as shown in FIG. 4. As a consequence, switches S1 and S2 are open while switches S3 and S4 are closed. In essence, signals generated at the outputs of the driver 46 are bypassed and directly shorted to ground. Any spurious noise spikes which occur at the magnetic head 30 are isolated by the open switches S1 and S2 and are prevented from gating into the filter circuit 52. It should also be noted that by virtue of grounding the floating charges caused by the spurious noise, the clamping circuit 50 actually shortens the clamping period C and allows a faster write-to-read transition.

The data reading mode begins after the completion of the clamping mode. To initiate the data reading mode, clamping control lines CL1 and CL2 are respectively powered to LOW and HIGH. This time, the switches S1 and S2 are closed and the switches S3 and S4 are open. As an illustration, suppose there is popcorn noise after the data writing process. The popcorn noise manifests itself as a voltage waveform 100 impinging upon nodes 96 and 98 as shown in FIGS. 2 and 4. The noise waveform 100 travels toward the bandpass filter 52 through the drivers 44 and 46, DC-filtering capacitors C1 and C2, and the closed switches S1 and S2. Again, capacitors C1 and C2 act as DC-filters which screen away any unwanted DC components of the waveform 100. The band-pass filter 52 performs the function of filtering out the high frequency Fourier components of the waveform 100. A somewhat truncated waveform 101 results at the outputs 52A and 52B of the filter circuit 52. The truncated waveform 101 is now ready to be amplified. With the gain of amplifier 54 digitally set at 1000 during the calibration process as described before, the waveform 101 is amplified 1000 times after passing through the amplifier 54. The resultant waveform is signified by reference numeral 102 available at the outputs 54A and 54B of the amplifier 54. It should be noted that in reality, a complementary version of the waveform 102 is actually available at the output 54B. For sake of conciseness in explanation, only the assertive version of the waveform 102 is herein illustrated.

Acceptable positive and negative noise levels are preset by the voltage levels at the threshold level lines TH1 and TH2, respectively. Beyond the preset voltage levels as mentioned, noise pulses would be discriminated as noise events. The waveform 102, after passing through buffers 56A and 56B, enters into comparator 57A and 57B having reference inputs 58A and 58B tied to threshold level lines TH1 and TH2, respectively. If the voltage levels at the waveform 102 exceed the threshold level TH1 or TH2, comparator 57A or 57A reports to the timing control and counter circuit 16 in which the excessive voltage is registered by the counter 62A or 62E as a noise event. Illustrated in FIG. 4 are noise events I and II, shown as output pulses tallied by the counter 62A, and noise events III and IV shown as output pulses counted by the counter 62E. Noise events I–IV can be stored in RAM 26 for later statistical analysis, for example.

Figure 5:
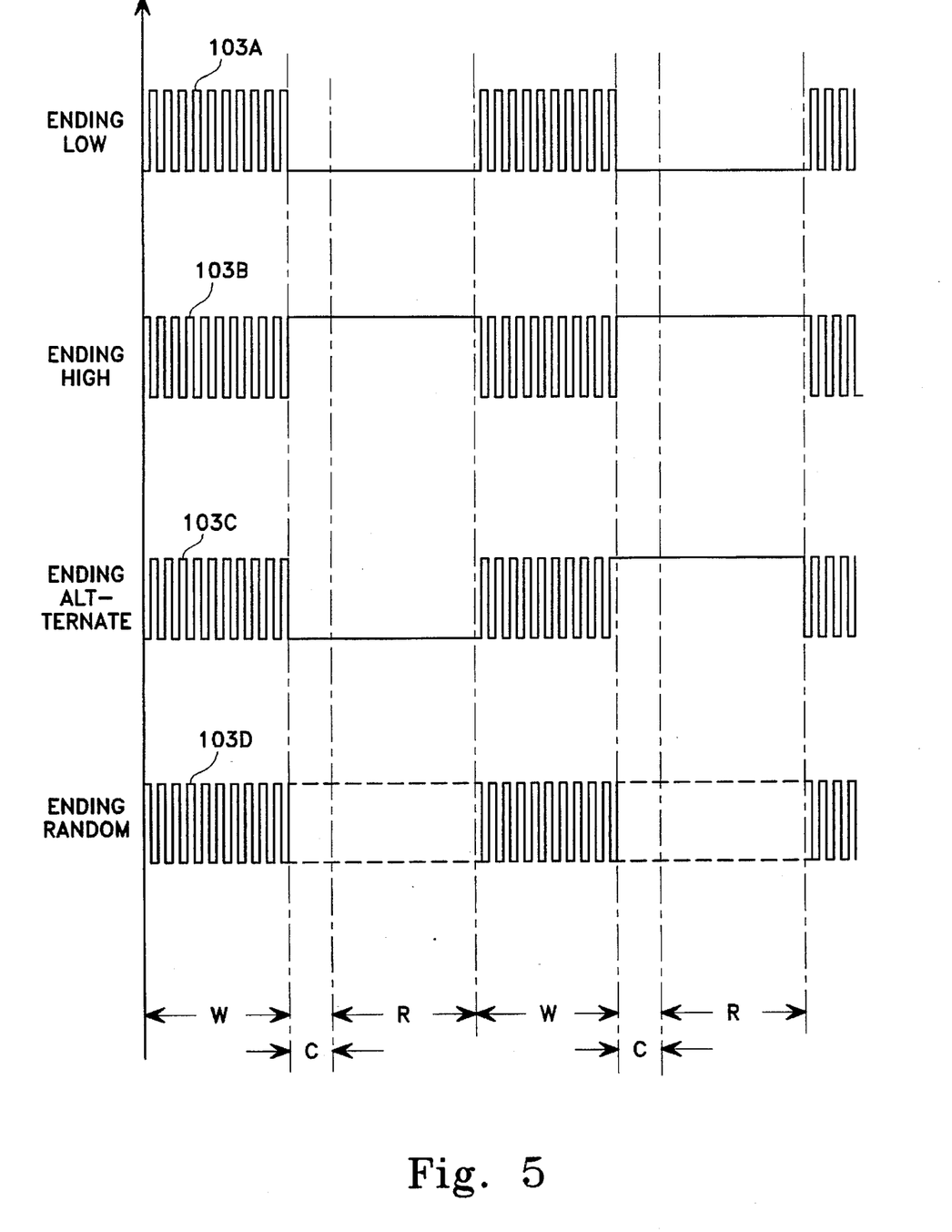
FIG. 5 is a timing diagram showing the various data patterns writable into the magnetic head.

Shown in FIG. 5 is a combination of data patterns writable into the magnetic head 30. The different data patterns are designed for the purpose of thorough investigation on the behavior of the popcorn noise. For example, the waveform 103A is a data pattern in which data are written into the magnetic head 30 during the write period W and remain low during the read period R. The pattern is called an "ending low" pattern. Similarly, from the same line of reasoning, waveforms 103B, 103C, and 103D are called "ending high", "ending alternate" and "ending random" respectively.

The Noise Simulation Circuit

In contrast with many popcorn noise testing setups as previously mentioned, the testing apparatus 2 can provide testing processes which can be assessed and fine-tuned. The incorporation of the noise simulation circuit 39 accomplishes this purpose by correlating the actual noise events with the simulated results.

Figure 6:
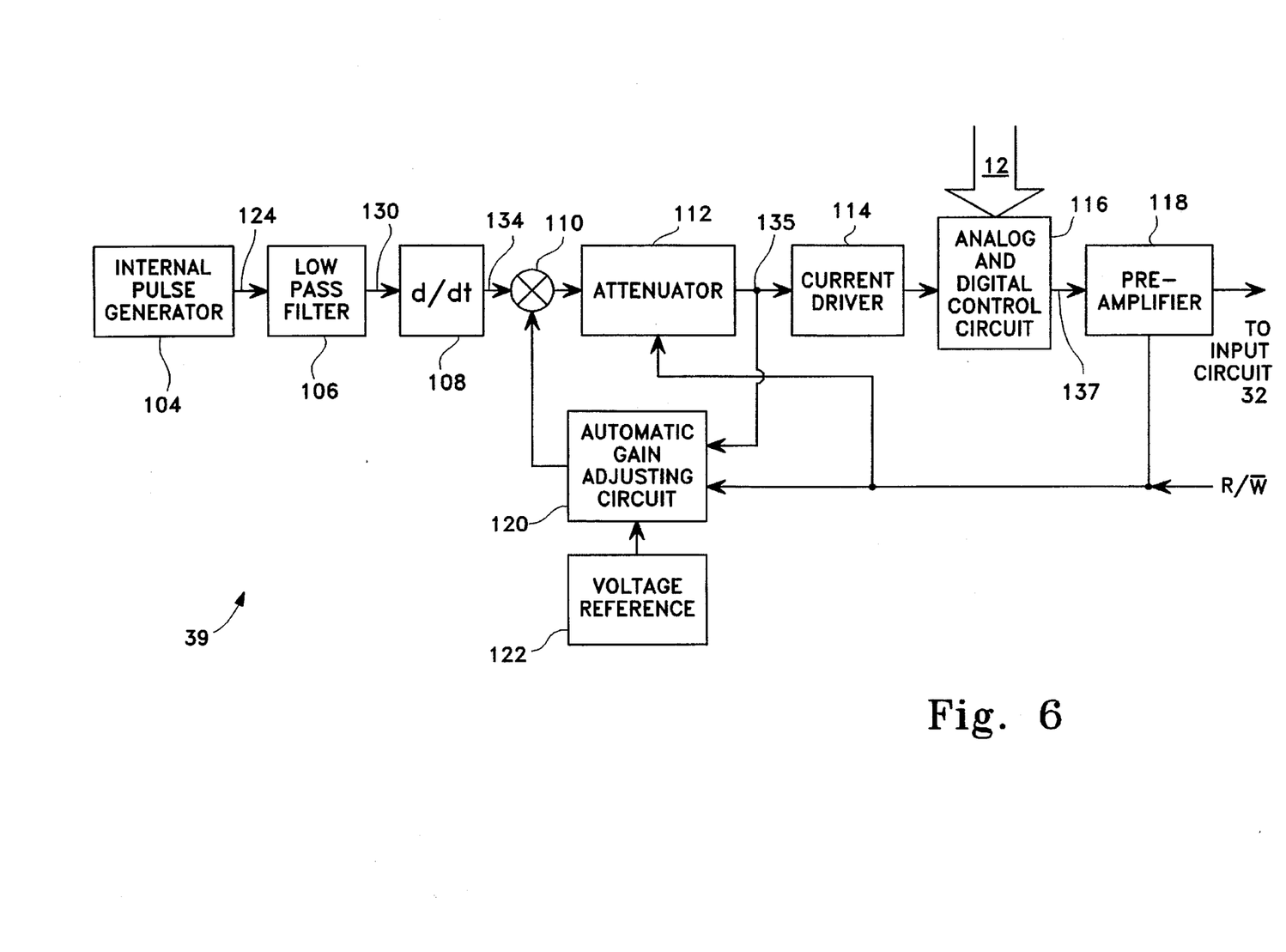
FIG. 6 is a general schematic drawing of the noise simulation circuit.

Reference is now made to FIG. 6 which shows a schematic block diagram of the simulation circuit 39. Source pulses are generated from an internal pulse generator 104. After passing through a low-pass filter 106, the filtered pulses are fed into a differentiator 108 which outputs a series of signal spikes flowing into an attenuator 112 via a mixer 110. The attenuator 112 provides exponentially decaying signal envelops for the signal spikes. The combined signal is then reinforced by the current driver 114 and flows through an analog and digital control circuit 116 which is implemented for controlling the number of pulses and the polarity of the simulated noise spikes. Part of the output of the control circuit 116, after passing through a pre-amplifier 118, is combined with the automatic gain adjusting circuit 120 and channeled back into the mixer 110 as feedback adjustment, using R/W or write gate signal as a control signal.

Figure 7:
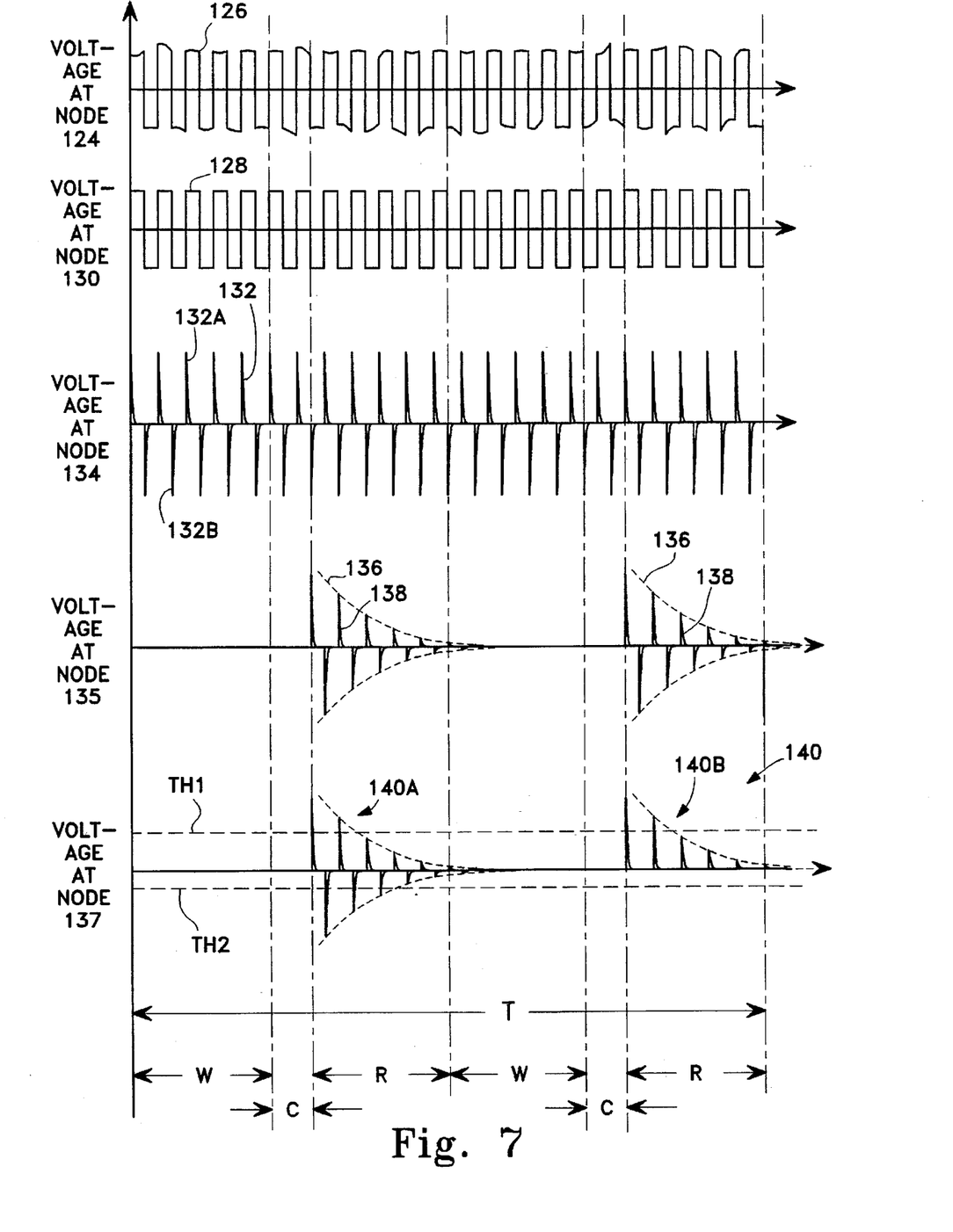
FIG. 7 is a timing diagram showing the relevant signal displays provided and generated by the noise simulation circuit of FIG. 6 during the process of simulated noise testing.

FIG. 7 illustrates the internal waveforms generated by the popcorn noise simulation circuit 39 during operation. To begin with, the three-way switch is first shifted to link the noise simulation circuit 39 to the input circuit portion 34 (FIG. 2). The internal pulse generator 104 provides at node 124 a rectangular pulse series signified by reference numeral 126 (FIG. 7). After passing through the low-pass filter 106, low frequency Fourier components of the pulse series 126 are filtered away resulting in, within a desired band-width, another pulse series 128 at node 130. Thereafter, the differentiator 108 differentiates the pulse series 128 into pulse spikes 132. That is, a series of pulse spikes 132 are formed at node 134 in accordance with the low-to-high or high-to-low transitions of the pulse series 128. The positive pulse spikes are signified by reference numerals 132A while the negative spikes are denoted by 132B. The attenuator 112 provides exponentially decaying signal envelopes 136 for the spiked pulses 132. The resultant waveform is a sequence of exponentially decaying spikes signified by reference numeral 138 as shown in FIG. 7. The analog and digital control circuit 116 dictates the number and polarity of the resultant simulated pulses. For example, shown in FIG. 7 is a simulated noise pulse sequence 140 at node 137 having a bipolar noise group 140A and a positive noise group 140B. The simulated noise pulse sequence 140 can be written into the input circuit 32 via the preamplifier 118, as if the testing apparatus 2 is detecting noise in a magnetic head, as mentioned previously.

Reference is now directed back to the simulated pulse sequence 140 shown in FIG. 7. Depending on the threshold levels TH1 and TH2 previously preset by reference supply circuit 18, the number of noise events can be precisely predicted prior to actual testing. As shown in FIG. 7 with the threshold level TH1 fixed at a predetermined level, TH1 crosses two noise spikes in each of the noise groups 140A and 140B. The number of noise events registered in counter 62A of the timing control and counter circuit 16 (FIG. 2) should be 4 for the time duration T. Similarly, with TH2 set at a more discriminating level, TH2 crosses 3 spikes in noise group 140A and the number of noise events should be 3 registered by the counter 62E in the timing control and counter circuit 16. The above predicted noise events are then compared with the noise counts counted by the timing control and counter circuit 16. Should there be any discrepancy between the two values, the noise tester 2 is not correctly reporting noise events and readjusting or fine tuning may be needed.

The implementation of the noise simulated circuit 39 allows the testing apparatus 2 to be tuned to a high degree of accuracy which no comparable prior art testing setups can provide.

Variations of the Preferred Embodiment

Finally, other changes are possible within the scope of the invention. For example, the testing apparatus 2 can be built without the noise simulation circuit 39, sacrificing performance in exchange for lower cost. The analog and digital circuit portions 4 and 6 can be fully integrated into a circuit board or an integrated circuit chip, without any clear physical distinction between the two portions. Furthermore, only the analog circuit portion 4, or the digital circuit portion 6, but not both, may be used in conjunction with other equipments to function as a self-sustaining testing system.

While the present invention has been shown and described with reference to the preferred embodiment thereof, it will be understood by those skilled in the art that these and other changes in form and detail may be made therein without departing from the scope and spirit of the invention.

What is claimed is:

1. An apparatus for detecting noise in magnetic heads comprising:

a head receiving input means for receiving a magnetic head;

a detector circuit; and an amplifier circuit having a digitally controlled gain input circuit including digital-to-analog converting means for allowing the presetting of the gain of said amplifier circuit prior to noise detection, said amplifier circuit being electrically disposed between said head receiving input means and said detector circuit;

wherein said detector circuit has a predetermined threshold level corresponding to an acceptable noise level in the magnetic head, such that when electrical noise in the magnetic head which passes through said amplifier circuit exceeds said predetermined threshold level, said detector circuit generates an output electrical signal as a noise event.

2. The testing apparatus as set forth in claim 1 including means for digitally controlling said predetermined threshold level.

3. The testing apparatus as set forth in claim 1 wherein said amplifier circuit further comprises an assertive output circuit and a complementary output circuit, and wherein said detector circuit further includes a first comparator circuit having a first noise threshold level and a second comparator circuit having a second noise threshold level, said assertive and complementary output circuits being electrically coupled to said first and second comparator circuits, respectively.

4. The testing apparatus as set forth in claim 3 wherein said digitally controlled gain input circuit is part of a reference voltage supply circuit having said digital-to-analog converting means which includes an analog input circuit and a digital input circuit for receiving an input analog voltage signal and an input digital signal, respectively, said reference voltage supply circuit further comprising:

first, second and third analog output circuits electrically connecting said digital-to-analog converting means to the gain of said amplifier circuit, and to reference input circuits of said first comparator and second comparator circuits, respectively;

wherein said first, second and third analog output circuits generate analog output voltage levels as fractions of said input analog voltage signal in response to said input digital signal, thereby allowing said amplifier gain, and first and second noise threshold levels, respectively, to be digitally controlled by said reference voltage supply circuit.

5. The testing apparatus as set forth in claim 4 wherein during the operation of said testing apparatus including an initial calibration process, said apparatus includes means for providing a periodic input signal of predetermined amplitude at said head receiving input means, and means responsive to said periodic input signal for presetting said first and second threshold levels of said first and second comparator circuits, respectively, and simultaneously increasing the gain of said amplifier circuit such that when said periodic signal passes through said amplifier circuit, said periodic signal increases in amplitude such that when the amplified amplitude marginally exceeds one of said predetermined threshold levels of said comparator circuits, the periodic input signal ceases to increase in value, thereby setting said gain at a fixed level and thus allowing said amplifier circuit to operate at a gain as a ratio of the amplitudes of one of said predetermined threshold levels and said periodic input signal.

6. The testing apparatus as set forth in claim 1 further comprising:
   a mode select circuit electrically disposed between said head receiving input means and said amplifier circuit;
   a clamping circuit coupled to said mode select circuit; and
   a timing control circuit electrically coupled to said mode select circuit, said timing control circuit being capable of generating a writing cycle, a reading cycle and a clamping cycle;
   wherein said apparatus is characterized by a writing model a reading mode, and a clamping mode between said writing and reading modes, such that during said writing mode said timing control circuit generates said writing cycle which activates said mode select circuit, thereby allowing electrical signal to be written into the magnetic head, and operating from said writing mode to said clamping mode, said timing control circuit generates a clamping cycle, spurious noise occurring during said clamping cycle is bypassed by said clamping circuit and prevented from detected as noise event, and when operating from said clamping mode to said reading mode, the electrical signal induces electrical noise in the magnetic head, so that during said reading mode said timing control circuit generates said reading cycle which activates said mode select circuit, thereby allowing the induced noise to pass through said amplifier circuit and be detected by said detector circuit as noise events in the magnetic head.

7. The testing apparatus as set forth in claim 6 further comprising a multiplexing circuit having a plurality of parallel digital input circuits and a serial output circuit, wherein a digital input signal provided at said parallel digital input circuits is multiplexed and converted into a serial output signal which corresponds to the electrical signal written in said magnetic head.

8. The testing apparatus as set forth in claim 1 further comprising a counter circuit coupled to said detector circuit such that noise events are cumulatively counted by said counter circuit.

9. The testing apparatus as set forth in claim 1 further comprising a noise simulation circuit for providing an output signal substantially the same as said head noise, wherein said simulation circuit generates an output signal with predefined noise occurrences such that when said noise simulation circuit is electrically coupled to said head receiving input means of said apparatus, and said detector circuit provides an output of noise events corresponding to said predefined noise occurrences as verification.

10. An apparatus for testing magnetic heads comprising:
    an amplifier circuit having a variable gain, an input circuit and an output circuit;
    digital-to-analog converting means connected to said variable gain of said amplifier circuit;
    a head receiving input means for receiving a magnetic head;
    a mode select circuit electrically disposed between said head receiving input means and the input circuit of said amplifier circuit;
    a clamping circuit disposed between said mode select circuit and said amplifier circuit;
    a detector circuit electrically connected to the output circuit of said amplifier circuit; and
    a timing control circuit electrically coupled to said mode select circuit for generating a writing cycle, a reading cycle and a clamping cycle;
    wherein said apparatus is characterized by a writing model a reading mode and a clamping mode between said writing and reading modes, such that during said writing mode said timing control circuit generates said writing cycle which activates said mode select circuit, thereby allowing electrical signal to be written into the magnetic head, and when operating from said writing mode to said clamping mode, said timing control circuit generates a clamping cycle, so that spurious noise occurring during said clamping cycle is bypassed by said clamping circuit and prevented from being detected as a noise event, and when operating from said clamping mode to said reading mode, the electrical signal induces electrical noise in the magnetic head, so that during said reading mode said timing control circuit generates said reading cycle which activates said mode select circuit, thereby allowing the induced noise to pass through said amplifier circuit and be detected by said detector circuit as noise events in the magnetic head.

11. The testing apparatus as set forth in claim 10 further comprising a multiplexing circuit having a plurality of parallel digital input circuits and a serial output circuit, wherein said multiplexing circuit multiplexes and converts digital input signal provided at said digital input circuits into serial output signal which corresponds to the electrical signal written in said magnetic head.

12. The testing apparatus as set forth in claim 11 further comprising a counter circuit electrically coupled to said detector circuit such that the noise events are cumulatively counted by said counter circuit.

13. The testing apparatus as set forth in claim 12 further comprising a noise simulation circuit capable of providing output signal substantially the same as said noise, wherein said simulation circuit generates output signal with predefined noise occurrences such that when said noise simulation circuit is electrically coupled to said input circuit of said apparatus, said detector circuit provides as output signals, noise events corresponding to said predefined noise occurrences as verification.

14. The testing apparatus as set forth in claim 10 wherein said digital-to-analog converting means is part of a reference voltage supply circuit having said digital-to-analog converting means which includes an analog input circuit and a digital input circuit for receiving an input analog voltage level and an input digital signal, respectively, said reference voltage supply circuit further comprising:
    first, second and third analog outputs electrically connecting said digital-to-analog converting means to the gain control input of said amplifier circuit, and the reference inputs of said first comparator and second comparator circuits, respectively;
    wherein said first, second and third analog outputs generate analog output voltage levels as fractions of said input analog voltage level in response to said input digital signal, thereby allowing said gain, first and second threshold levels, respectively, to be digitally controlled by said reference voltage supply circuit.

15. The testing apparatus as set forth in claim 14 wherein the operation of said testing apparatus includes means for providing an initial calibration process in which a periodic signal of predetermined amplitude is first provided at said head receiving input circuit, and wherein said input digital signal presets said first and second threshold levels of said first and second comparator circuits, respectively, and simultaneously increases the gain of said amplifier circuit such that when said periodic signal passes through said amplifier circuit, said periodic signal increases in amplitude such that when the amplified amplitude marginally exceeds one of said predetermined threshold levels of said comparator circuits, the input digital signal ceases to increase in value, thereby setting said gain at a fixed level and allowing said amplifier circuit to operate at a gain as a ratio of the amplitudes of one of said predetermined threshold levels and said periodic signal.

16. An apparatus for testing noise in a magnetic head comprising:

- an input circuit having an input port adapted for receiving the magnetic head;
- a mode select circuit electrically coupled to said input circuit;
- a timing control circuit electrically coupled to said mode select circuit for generating a writing cycle, a reading cycle and a clamping cycle;
- a pattern generator circuit electrically coupled to said input circuit for generating a predefined signal pattern;
- an amplifier circuit having a gain input connected to digital-to-analog controlled means, said amplifier circuit being coupled to said mode select circuit; and
- a detector circuit electrically connected to said amplifier circuit;
- wherein said apparatus is characterized by a writing mode, a clamping mode and a reading mode, such that during said writing mode, said timing control circuit generates said writing cycle which activates said mode select circuit and allows the predefined signal pattern to be written in the magnetic head, and such that during said clamping mode, said timing control circuit generates said clamping cycle which activates said mode select circuit to bypass and prevent noise induced in the magnetic head from passing through said detector circuit, and such that during said reading mode, said timing control circuit generates said reading cycle which activates said mode select circuit allowing noise induced by the predefined signal pattern written in the magnetic head during said writing cycle to pass through said detector circuit and be detected as noise events.

17. The testing apparatus as set forth in claim 16 wherein said analog-to-digital converting means is part of a reference voltage supply circuit having said digital-to-analog converting means which includes an analog input and a digital input for receiving an input analog voltage level and an input digital signal, respectively, said reference voltage supply circuit further comprising:

- first, second and third analog outputs electrically connecting said digital-to-analog converting means to the gain control input circuit of said amplifier circuit, and the reference inputs of said first comparator and second comparator circuits, respectively;
- wherein said first, second and third analog outputs generate analog output voltage levels as fractions of said input analog voltage level in response to said input digital signal, thereby allowing said gain, first and second threshold levels, respectively, to be digitally controlled by said reference voltage supply circuit.

18. The testing apparatus as set forth in claim 16 further comprising a noise simulation circuit capable of providing an output signal substantially the same as said noise, wherein said simulation circuit generates an output signal with predefined noise occurrences such that when said noise simulation circuit is electrically coupled to said input circuit of said apparatus, said detector circuit outputs noise events corresponding to said predefined noise occurrences as verification.

19. An apparatus for detecting noise in magnetic heads, said apparatus being characterized by a reading mode and a writing mode, comprising:

- an analog circuit portion including a head receiving input circuit for receiving a magnetic head, a detector circuit, and an amplifier circuit disposed between said head receiving input circuit and detector circuit, said amplifier circuit having a variable gain input;
- a digital circuit portion having a processor circuit, a counter circuit, a pattern generation circuit, and data buses electrically connecting said processor, counter and pattern generation circuits;
- a plurality of signal lines electrically connecting said analog circuit portion and said digital circuit portion, said plurality of signal lines including a first signal line electrically connecting said pattern generation circuit and said input circuit, and a second signal line electrically connecting said detector circuit and said counter circuit; and
- a reference voltage supply circuit which includes digital-to-analog converting means having an analog input and a digital input for receiving an input analog voltage level and an input digital signal, respectively, and an analog output electrically connected to said variable gain input of said amplifier circuit such that said analog output generates analog output voltage levels as fractions of the input analog voltage level in response to the input digital signal, thereby allowing the variable gain of said amplifier circuit to be digitally preset by said reference voltage supply circuit prior to noise detection;
- wherein during said writing mode, said processor circuit activates said data generation circuit allowing data to be written into the magnetic head via said input circuit through said first signal line, and operating from said writing mode to said reading mode electrical noise is induced in the magnetic head, such that during said reading mode, said processor circuit deactivates said data generation circuit allowing the induced electrical noise to pass through said amplifier circuit into said detector circuit, said detector circuit being electrically coupled to said counter circuit which registers the electrical noise as noise events in the magnetic head.

20. The testing apparatus as set forth in claim 19 further comprising first and second comparator circuits which includes respective first and second threshold levels, said reference voltage supply circuit and said comparator circuits constitute means for providing initial calibration for said testing apparatus in which a periodic signal of predetermined amplitude is first provided at said input circuit during operation of said testing apparatus, and wherein said input digital signal presets said first and second threshold levels of said first and second comparator circuits, respectively, and simultaneously increases the gain of said amplifier circuit such that when said periodic signal passes through said amplifier circuit, said periodic signal increases in amplitude such that when the amplified signal exceeds one of said predetermined threshold levels of said comparator circuits, the input digital signal ceases to increase in value, thereby setting said gain at a fixed level and allowing said amplifier circuit to operate at a gain as a ratio of the amplitudes of one of said predetermined threshold level and said periodic signal.

21. The testing apparatus as set forth in claim 20 further comprising a noise simulation circuit capable of providing an output signal substantially the same as said noise, wherein said simulation circuit generates an output signal with predefined noise occurrences such that when said noise simulation circuit is electrically coupled to said input circuit of said apparatus, said detector circuit outputs noise events corresponding to said predefined noise occurrences as verification.

* * * * *